United States Patent
Aiba et al.

(10) Patent No.: US 10,196,031 B2
(45) Date of Patent: Feb. 5, 2019

(54) IMAGE PROCESSING DEVICE THAT SWITCHES FROM NORMAL MODE TO AREA LIMITATION MODE HAVING NO APPEARANCE OF PEDESTRIAN PROTECTION MECHANISM

(71) Applicant: Fuji Jukogyo Kabushiki Kaisha, Tokyo (JP)

(72) Inventors: Tomoari Aiba, Tokyo (JP); Shinya Motomura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 134 days.

(21) Appl. No.: 15/367,027

(22) Filed: Dec. 1, 2016

(65) Prior Publication Data

US 2017/0203712 A1 Jul. 20, 2017

(30) Foreign Application Priority Data

Jan. 20, 2016 (JP) ................................. 2016-009059

(51) Int. Cl.
*B60R 21/26* (2011.01)
*B60R 11/04* (2006.01)
(Continued)

(52) U.S. Cl.
CPC .............. *B60R 21/36* (2013.01); *B60R 11/04* (2013.01); *B60R 21/00* (2013.01); *B60R 21/013* (2013.01);
(Continued)

(58) Field of Classification Search
CPC . B60R 11/04; B60R 2021/0027; B60R 21/00; B60R 21/013; B60R 21/36; G06K 9/00805; G06K 9/2054
See application file for complete search history.

(56) References Cited

U.S. PATENT DOCUMENTS 7,669,685 B2 * 3/2010 Takahashi ........... B60R 21/0134
180/271
8,798,867 B2 * 8/2014 Stoll ....................... B60R 21/01
180/274

(Continued)

FOREIGN PATENT DOCUMENTS

JP 2004-284440 A 10/2004

*Primary Examiner* — Francis Geroleo
(74) *Attorney, Agent, or Firm* — McGinn I.P. Law Group, PLLC.

(57) ABSTRACT

An image processing device includes an onboard camera, an image recognition processor, an object recognition processor and an image-mode switching unit. The onboard camera captures an image ahead of a vehicle. The image recognition processor generates a distance image within an image recognition area on the basis of the captured image. The object recognition processor recognizes an object within the image recognition area and a distance to the object on the basis of the two kinds of images. The image-mode switching unit switches the image recognition area to be recognized by the object recognition processor. The image-mode switching unit checks whether a collision with a pedestrian is detected and an activation command signal is output to a pedestrian protection mechanism. When an output of the activation command signal is detected, the image-mode switching unit switches to a mode where an image area having no pedestrian protection mechanism is set as the image recognition area.

4 Claims, 5 Drawing Sheets

(51) Int. Cl.
 *G06K 9/00* (2006.01)
 *B60R 21/36* (2011.01)
 *B60R 21/00* (2006.01)
 *B60R 21/013* (2006.01)
 *G06K 9/20* (2006.01)

(52) U.S. Cl.
 CPC ....... *G06K 9/00805* (2013.01); *G06K 9/2054* (2013.01); *B60R 2021/0027* (2013.01)

(56) References Cited

U.S. PATENT DOCUMENTS

| | | | |
|---|---|---|---|
| 9,254,804 B2* | 2/2016 | Wanami | B60R 21/0134 |
| 9,457,763 B2* | 10/2016 | Takenaka | B60R 21/36 |
| 2004/0182629 A1* | 9/2004 | Takahashi | B60R 21/013 |
| | | | 180/274 |
| 2006/0213714 A1* | 9/2006 | Igawa | B60R 21/0134 |
| | | | 180/274 |
| 2007/0222566 A1* | 9/2007 | Tsuji | G06K 9/00369 |
| | | | 340/435 |
| 2008/0049975 A1* | 2/2008 | Stiegler | G06T 7/20 |
| | | | 382/104 |
| 2013/0218419 A1* | 8/2013 | Lind | B60R 21/00 |
| | | | 701/45 |
| 2014/0207341 A1* | 7/2014 | Wanami | B60R 21/0134 |
| | | | 701/46 |
| 2014/0207344 A1* | 7/2014 | Ihlenburg | E05F 15/73 |
| | | | 701/49 |
| 2016/0200275 A1* | 7/2016 | Le Merrer | B60R 21/0134 |
| | | | 701/45 |
| 2016/0375899 A1* | 12/2016 | Takenaka | B60T 7/22 |
| | | | 701/41 |

* cited by examiner

IMAGE PROCESSING DEVICE THAT SWITCHES FROM NORMAL MODE TO AREA LIMITATION MODE HAVING NO APPEARANCE OF PEDESTRIAN PROTECTION MECHANISM

CROSS-REFERENCE TO RELATED APPLICATIONS

The present application claims priority from Japanese Patent Application No. 2016-009059 filed on Jan. 20, 2016, the entire contents of which are hereby incorporated by reference.

BACKGROUND

1. Technical Field

The present invention relates to an image processing device that allows drive assistance control based on a camera image to resume without stopping even when a pedestrian protection mechanism is activated.

2. Related Art

When a pedestrian collides with the front bumper of a vehicle traveling at a predetermined speed or higher, the front bumper sweeps up the pedestrian's legs, causing the upper body of the pedestrian to fall onto the front hood and the head of the pedestrian to secondarily collide with, for instance, the front windshield and the front pillars (A pillars).

Pedestrian protection airbags are known as a countermeasure for avoiding such secondary collisions. With regard to such a pedestrian protection airbag, when a collision with a pedestrian is detected, an airbag provided in the engine compartment is inflated and deployed toward the front windshield and the front pillars (A pillars) so as to cover these rigid sections, thereby preventing the pedestrian's head from directly colliding with the rigid sections. In another known technology for avoiding a secondary collision, when a pedestrian collides with a running vehicle, the front hood is popped up so that the front hood functions as a cushion member.

In a vehicle equipped with an onboard camera that recognizes the front of the vehicle, when the pedestrian protection mechanism, such as the pedestrian protection airbag or the pop-up front hood, is activated, the activation of the pedestrian protection mechanism undesirably causes a part of the pedestrian protection airbag or the front hood to enter the field angle. If the part of the airbag or the front hood is erroneously recognized as an obstacle located within a very short distance, there is a possibility of erroneous activation of drive assistance control, such as autonomous emergency braking (AEB). Therefore, if the pedestrian protection mechanism is activated, the drive assistance control based on an image captured by the onboard camera is automatically turned off.

However, when the drive assistance control stops, the driver may try to avoid a collision with the pedestrian and perform erroneous driving (such as erroneous steering and erroneous gas-pedal handling), possibly making it impossible to prevent a secondary collision of the vehicle (such as a collision with a power pole, driving over a road shoulder, and so on). Thus, for instance, Japanese Unexamined Patent Application Publication (JP-A) No. 2004-284440 discloses a technology in which, even if the airbag or the front hood blocks the front windshield and obstructs the field of view, this is appropriately dealt with by ensuring the field of view with an image captured by a camera disposed in front of the rearview mirror.

However, in the technology disclosed in JP-A No. 2004-284440, the positional relationship between the camera and the airbag as well as the front hood has to be adjusted so that the airbag and the front hood do not enter the field angle of the camera even when the airbag or the front hood blocks the front of the front windshield.

As a result, performing the adjustment by limiting the view angle (field angle) of the camera would pose a problem for normal drive assistance control, and moreover, performing the adjustment by limiting the inflation and deployment of the airbag or the pop-up of the front hood would be problematic in adding constraints to the avoidance of a secondary collision with a pedestrian in the event of a collision.

SUMMARY OF THE INVENTION

It is desirable to provide an image processing device that not only allows drive assistance control based on an image captured by an onboard camera to resume without limiting the operation of a pedestrian protection mechanism so as to effectively protect a pedestrian in the event of a collision, but can also prevent a secondary collision of a vehicle.

An aspect of the present invention provides an image processing device including an onboard camera, an image recognition processor, an object recognition processor, and an image-mode switching unit. The onboard camera captures an image of a driving environment in front of a vehicle. The image recognition processor generates a distance image within an image recognition area on the basis of the image captured by the onboard camera. The object recognition processor recognizes an object within the image recognition area and a distance to the object on the basis of the image captured by the onboard camera and the distance image generated by the image recognition processor. The image-mode switching unit switches the image recognition area to be recognized by the object recognition processor. The image-mode switching unit checks whether a collision with a pedestrian is detected and an activation command signal is output to a pedestrian protection mechanism. If an output of the activation command signal is detected, the image-mode switching unit switches from a normal mode, in which a normal effective image area is entirely set as the image recognition area, to an area limitation mode, in which an image area having no appearance of the pedestrian protection mechanism therein is set as the image recognition area.

DETAILED DESCRIPTION

Figure 1:
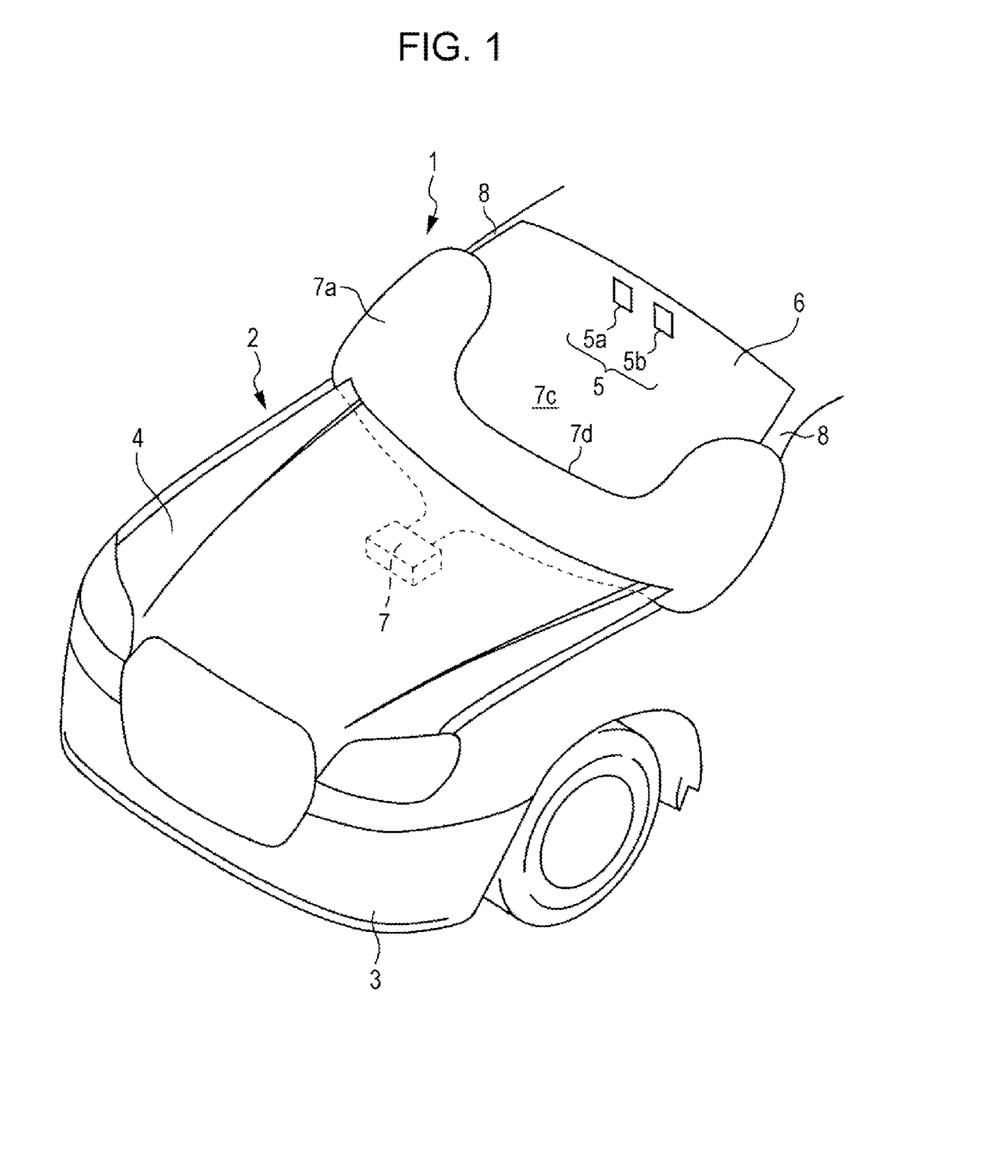
FIG. 1 is a perspective view of a front vehicle body in a state where a pedestrian protection airbag is inflated and deployed.

An example of the present invention will be described below with reference to the drawings. A front vehicle body 2 of a vehicle 1 illustrated in FIG. 1 is provided with an engine compartment (not illustrated). A front bumper 3 is disposed in front of this engine compartment, and the top of the engine compartment is covered with a front hood 4 in an openable-closable manner.

An onboard camera 5 is disposed at the inner side of an upper area of a front windshield 6 of the vehicle 1. This onboard camera 5 captures an image of the driving environment in front of the vehicle 1 and is a color camera having a main camera 5a and a sub camera 5b. The cameras 5a and 5b are disposed at left and right positions that are evenly spaced apart from each other from the center in the vehicle width direction. The main camera 5a captures a reference image (right image) required when performing stereo processing, and the sub camera 5b captures a comparative image (left image) in this processing.

An airbag module 7 as a pedestrian protection mechanism is disposed at the inner surface of the front hood 4. The airbag module 7 includes a pedestrian protection airbag (simply referred to as "airbag" hereinafter) 7a and an inflator 7b (see FIG. 2) for deploying the airbag 7a. The front hood 4 is of a forward opening type and opens and closes about hood hinges (not illustrated) provided at opposite widthwise sides of the rear of the front hood 4. When the airbag 7a is to be inflated and deployed, a hood actuator 9 provided at the hood hinges causes the rear of the front hood 4 to pop up, thereby causing the airbag 7a to be inflated and deployed through the gap, as illustrated in FIG. 1.

The inflated and deployed airbag 7a covers rigid sections, such as the lower area of the front windshield 6, left and right front pillars (A pillars) 8, and a front cowling and front wipers (not illustrated). Furthermore, the airbag 7a, when inflated and deployed, has a U-shaped clearance section 7c in the middle thereof, and the bottom of this clearance section 7c serves as an upper edge 7d of the airbag 7a. This clearance section 7c ensures the field of view for the driver and the onboard camera 5.

Figure 2:
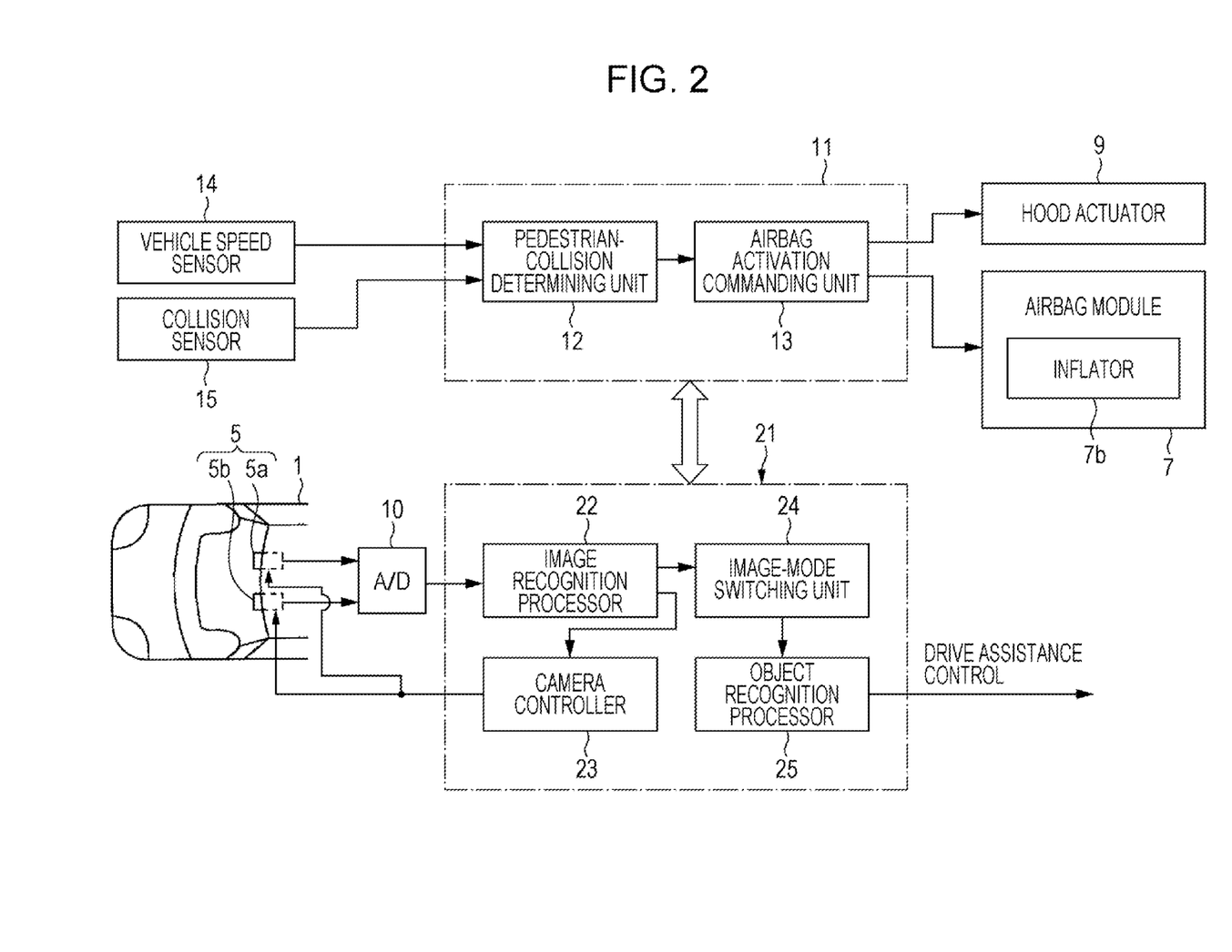
FIG. 2 illustrates the configuration of relevant parts of a pedestrian protection device and an image processing device.

As illustrated in FIG. 2, the inflator 7b provided in the airbag module 7 and the hood actuator 9 are activated on the basis of a command signal from a pedestrian protection airbag unit 11 constituting a pedestrian protection device.

In a state where the cameras 5a and 5b are synchronized with each other, the onboard camera 5 outputs R, G, and B analog images, which are subsequently converted into digital images of predetermined gradations by an A/D converter 10 and are output to an image recognition unit 21. The pedestrian protection airbag unit 11 and the image recognition unit 21 constituting the image processing device are mainly constituted of microcomputers and each have, for instance, a commonly-known central processing unit (CPU), read-only memory (ROM), and random access memory (RAM). The ROM stores therein, for instance, various types of programs to be executed by the CPU as well as fixed data.

The pedestrian protection airbag unit 11 includes a pedestrian-collision determining unit 12 and an airbag activation commanding unit 13 as airbag activating functions to be processed by the CPU. The pedestrian-collision determining unit 12 determines a collision with a pedestrian on the basis of a vehicle speed detected by a vehicle speed sensor 14 and a pressure change detected by a collision sensor 15. The collision sensor 15 is, for instance, a pressure sensor communicating with a long pressure tube or pressure chamber disposed along the front bumper 3 and within the front bumper 3 extending leftward and rightward in the vehicle width direction. The collision sensor 15 detects a change in collision pressure when the pressure tube or the pressure chamber is crushed as a result of a collision.

When the vehicle speed is higher than or equal to a pedestrian-collision determination vehicle speed and the collision pressure detected by the collision sensor 15 is within a preset pressure range for detecting a collision with a pedestrian (a light collision, such as when the front bumper 3 is slightly dented), the pedestrian-collision determining unit 12 determines that a collision with a pedestrian has occurred. If the pedestrian-collision determining unit 12 determines that a collision with a pedestrian has occurred, the airbag activation commanding unit 13 outputs a drive signal to the hood actuator 9 and also outputs an activation command signal for the inflator 7b to the airbag module 7.

Then, the hood actuator 9 causes the rear of the front hood 4 to pop up and open, and the airbag module 7 activates the inflator 7b so that gas is injected into the airbag 7a. As a result, the airbag 7a becomes inflated and deployed while expanding leftward and rightward in the direction of the front windshield 6 from the rear of the front hood 4 opened by the hood actuator 9, so that the airbag module 7 covers the rigid sections, such as the left and right front pillars (A pillars) 8 illustrated in FIG. 1 and the front cowling and the front wipers (not illustrated), thereby preventing the pedestrian's head from colliding directly with these rigid sections.

The image recognition unit 21 includes an image recognition processor 22, a camera controller 23, an image-mode switching unit 24, and an object recognition processor 25 as image recognizing functions to be processed by the CPU. The image recognition processor 22 recognizes objects in front of the vehicle 1 on the basis of image data captured by the onboard camera 5. The objects include three-dimensional objects, such as a leading vehicle, a road sign, a traffic light, an oncoming vehicle, and a pedestrian, as well as a lane line and text on the road. The image recognition processor 22 recognizes each of these objects and also determines the distance from the object to the vehicle 1 from the parallax between the main camera 5a and the sub camera 5b so as to generate a distance image.

Figure 6:
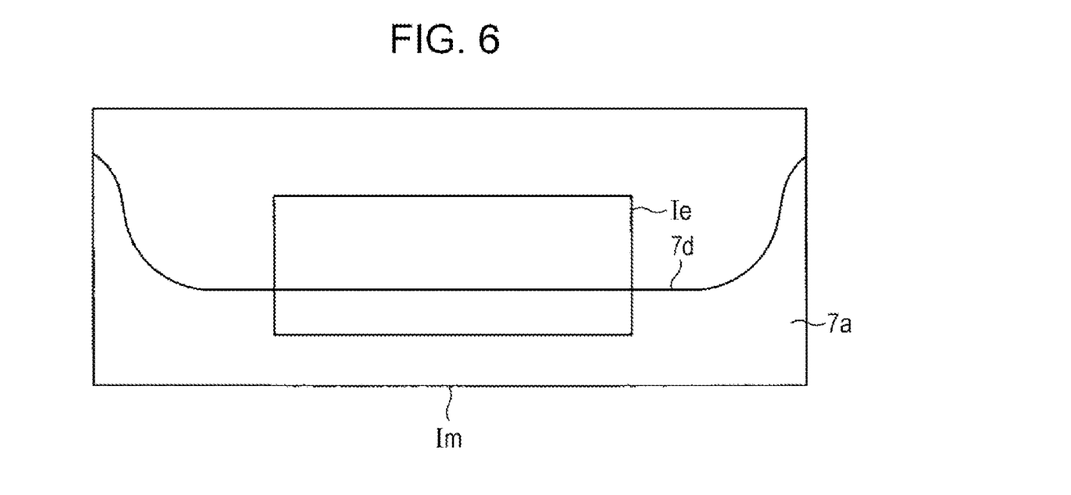
FIG. 6 illustrates an image captured by an onboard camera.
Figure 7A:
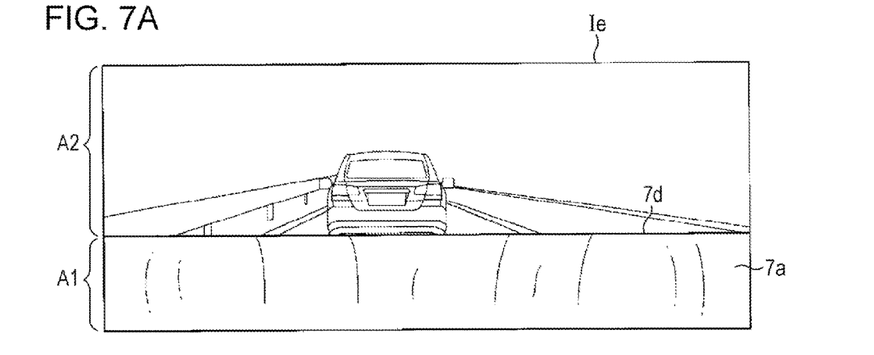
FIG. 7A illustrates an actual image of an effective image area.
Figure 7B:
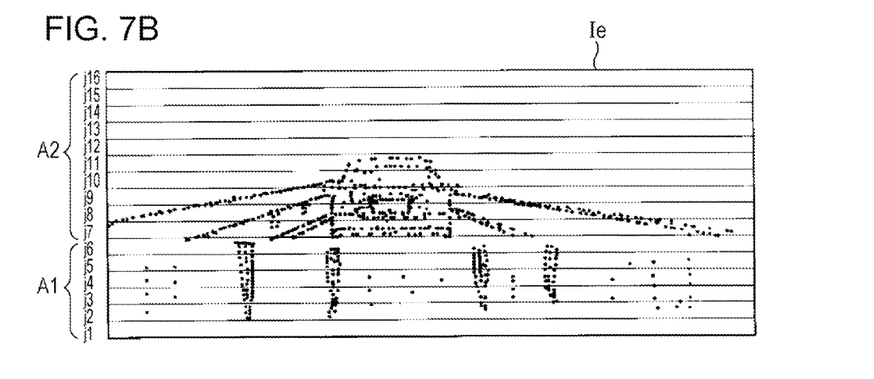
FIG. 7B illustrates a distance image of the effective image area.

Specifically, as illustrated in FIG. 6, the image recognition processor 22 loads a part of an actual image area Im captured by the onboard camera 5 as an effective image area Ie. Then, as illustrated in FIG. 7A, on the basis of an image of the effective image area Ie loaded by the cameras 5a and 5b, a distance image formed of a distance-pixel-distributed image having distance information is generated, as illustrated in FIG. 7B. With regard to the vertical direction of the effective image area Ie in the captured image, the lower side is the near side and the upper side is far side.

The camera controller 23 reads an average brightness value of the image data processed by the image recognition processor 22, sets an exposure time (i.e., shutter speed) that provides an optimal brightness in an image capturing process of a subsequent frame, and controls the exposure of each of the cameras 5a and 5b on the basis of this exposure time.

The image-mode switching unit 24 switches between a normal mode, in which the image recognition area is set to the entire effective image area Ie, and an area limitation mode, in which the effective image area Ie is limited, in accordance with whether an activation command signal is output from the airbag activation commanding unit 13. In this area limitation mode, if an image of the airbag 7*a* appears in the effective image area Ie, as illustrated in FIG. 7A, the boundary with the forward image is detected, and a captured vertical image area at the near side relative to this boundary is masked as a non-usable area A1. As a result, a captured vertical image area at the far side relative to the boundary serves as a usable area A2, and this usable area A2 is set as the image recognition area.

The object recognition processor 25 performs a known grouping process on the distance image (see FIG. 7B) of the image recognition area set by the image-mode switching unit 24 and compares the distance image with a three-dimensional frame (window) stored in advance, so as to recognize objects in front of the vehicle 1, such as a leading vehicle, a pedestrian, and a driving lane, and the distance to each object. Then, the object recognition processor 25 causes a storage unit, such as the RAM, to temporarily store the recognized objects and distances as object information. Since the method of determining the distance between each object and the vehicle 1 is commonly known, a description thereof will be omitted here.

On the basis of the object information recognized by the object recognition processor 25 and temporarily stored in the storage unit, various types of drive assistance control, such as automatic steering control, automatic tracking control, and automatic braking control, are executed, thereby assisting the driver in driving.

Figure 3:
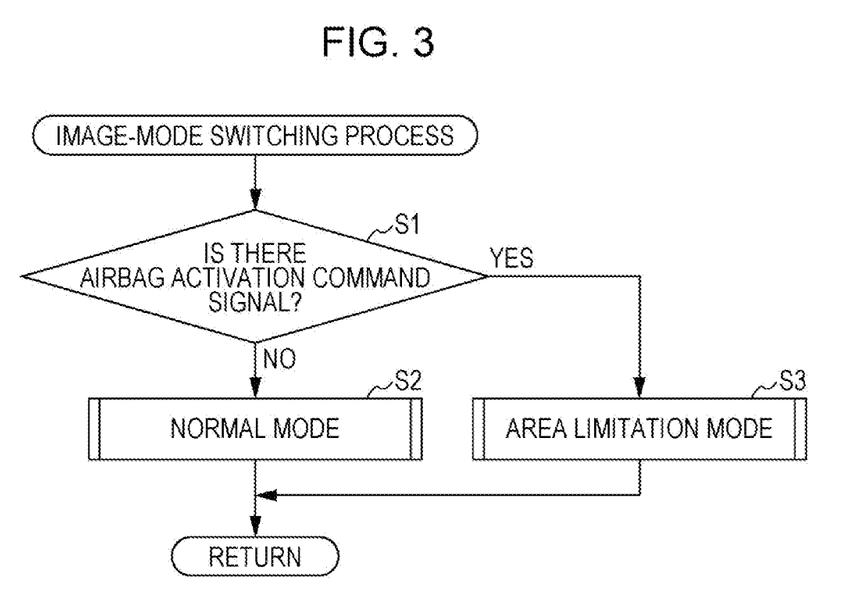
FIG. 3 is a flowchart illustrating an image-mode switching process routine.

Next, the above-described image-mode switching process executed by the image-mode switching unit 24 will be described in more detail in accordance with an image-mode switching process routine illustrated in FIG. 3.

Specifically, in this routine, it is first checked in step S1 whether an activation command signal output from the airbag activation commanding unit 13 of the pedestrian protection airbag unit 11 to the airbag module 7 is received. If the activation command signal is not received, the process proceeds to step S2 to execute the normal mode, and then exits the routine. In contrast, if the activation command signal is received, the process proceeds to step S3 to execute the area limitation mode, and then exits the routine. In the normal mode executed in step S2, the entire effective image area Ie illustrated in FIG. 6 is set as the image recognition area.

Figure 4:
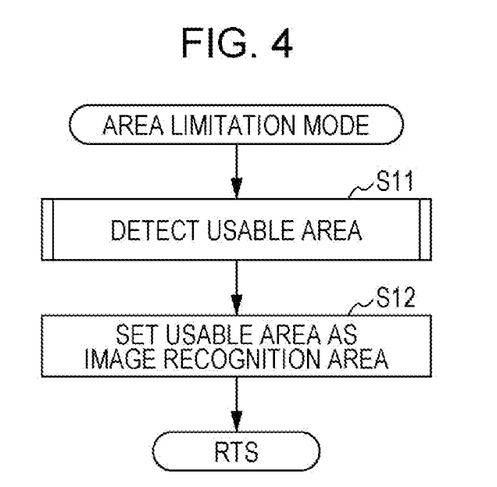
FIG. 4 is a flowchart illustrating an area-limitation-mode routine.

The area limitation mode in step S3 described above is executed in accordance with an area-limitation-mode subroutine illustrated in FIG. 4. In this subroutine, the usable area A2 (see FIG. 7) is first set in step S11 by detecting the boundary between the non-usable area A1 and the usable area A2. Methods for detecting the boundary between the non-usable area A1 and the usable area A2 include a first method in which the detection is performed on the basis of the color of the airbag 7*a* and a second method in which the detection is performed on the basis of the number of effective distance pixels in the distance image. In the first method in which the detection is performed on the basis of the color of the airbag 7*a*, the color of the airbag 7*a* (which is set on the basis of, for instance, a combination of brightness values (R, G, and B) of 256 gradations) is preliminarily stored in a storage unit, such as the ROM, and a region having the brightness value corresponding to the airbag 7*a* is detected from the actual image of the effective image area Ie captured by the main camera 5*a*, as illustrated in FIG. 7A. Then, the upper edge 7*d* having the detected brightness value is searched and is set as the boundary between the airbag 7*a* and the driving environment in front of the vehicle 1. A captured vertical image area at the near side relative to this boundary is masked as the non-usable area A1. As a result, a captured vertical image area at the far side relative to the boundary is set as the usable area A2.

Subsequently, the process proceeds to step S12 to set the usable area A2 as the image recognition area, and then exits the routine.

In a case where the pedestrian protection mechanism is of a popup hood type that protects a pedestrian by popping up the rear of the front hood 4, the color of the rear edge of the front hood 4 may be stored, and a region corresponding to the brightness value thereof is detected from the actual image, such that the upper edge thereof is set as the boundary.

According to this method, the boundary with the non-usable area A1 caused by the appearance of the airbag 7*a* is determined from the actual image and the distance image so that a maximum usable area A2 can be ensured. In the second method in which the detection is performed on the basis of the number of effective distance pixels in the distance image, if the airbag 7*a* appears in the effective image area Ie, seams and wrinkles in the airbag 7*a* would be erroneously detected as effective distance pixels. This causes the number of effective distance pixels (i.e., the number of pixels that can actually be provided for calculating the distance) to decrease significantly. Therefore, the number of effective distance pixels is determined for each row (in the horizontal direction), and the numbers of effective distance pixels in adjacent rows are compared from a j1 row to a j16 row in the vertical direction in FIG. 7B. A row in which the number of effective distance pixels increases drastically (i.e., the j7 row in FIG. 7C) is identified as the boundary between the airbag 7*a* and the driving environment in front of the vehicle 1, and a captured vertical image area at the near side relative to this boundary is masked as the non-usable area A1. As a result, a captured vertical image area at the far side relative to the boundary is set as the usable area A2.

Figure 7C:
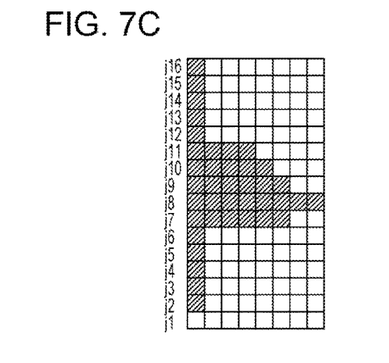
FIG. 7C illustrates the number of effective distance pixels in each row of the distance image illustrated in FIG. 7B.

Alternatively, the number of effective distance pixels in the horizontal direction and a preset number of non-usable-area determination pixels are compared with each other for each of the rows from the j1 row to the j16 row in the vertical direction in FIG. 7B, and the position where one condition (i.e., the number of effective pixels≥the non-usable determination value) changes to another condition (i.e., the number of effective pixels<the non-usable determination value) is identified as the boundary (i.e., between the j6 row and the j7 row in FIG. 7C). A captured vertical image area at the near side relative to this boundary is masked as the non-usable area A1, and a captured vertical image area at the far side relative to the boundary is set as the usable area A2.

In the case where the pedestrian protection mechanism is of a popup hood type, although protrusions and recesses on the inner surface of the front hood 4 would be erroneously detected as the number of effective distance pixels, this number of effective distance pixels is an extremely small value. Therefore, the boundary is identified on the basis of this number of effective distance pixels, similarly to the above description.

Figure 5:
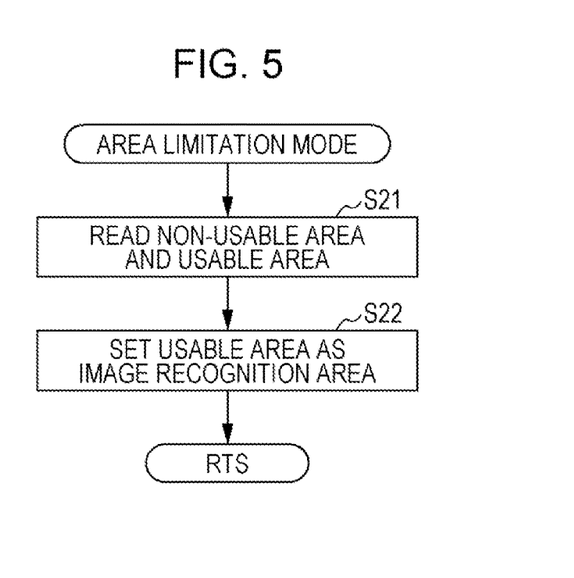
FIG. 5 is a flowchart illustrating an area limitation mode according to another method.

FIG. 5 illustrates an area-limitation-mode subroutine according to another method. In the above-described subroutine, the boundary between the airbag 7*a* and the driving environment in front of the vehicle 1 is identified on the basis of either one of the actual image and the distance image. Alternatively, in this example, the non-usable area A1 to be masked and the usable area A2 are preset, and the image recognition area is univocally set on the basis of the preset non-usable area A1 and usable area A2.

In this subroutine, the preliminarily-stored non-usable area A1 and usable area A2 are first read in step S21. These areas A1 and A2 are determined from test or simulation and are stored as fixed data in a storage unit, such as the ROM. Specifically, in accordance with test or simulation, the boundary of the upper edge 7d of the airbag 7a is detected from the appearance of the effective image area Ie when the airbag 7a is inflated and deployed. Then, a captured vertical image area at the near side relative to this boundary is masked as the non-usable area A1, and a captured vertical image area at the far side relative to the boundary is set as the usable area A2.

Subsequently, the process proceeds to step S22 in which an image area corresponding to the non-usable area A1 of the effective image area Ie is masked, whereas an image area corresponding to the usable area A2 is set as the image recognition area. The process then exits the routine.

According to this method, since the usable area A2 is instantaneously set, it is possible to quickly deal with inflation and deployment of the airbag 7a.

According to this example, even when the pedestrian protection airbag 7a is inflated and deployed and appears in the field angle of the onboard camera 5, the image area with the airbag 7a appearing therein is masked as the non-usable area A1, and the vertical image area is set as the usable area A2. Since this usable area A2 is set as the image recognition area, the drive assistance control on the basis of the image captured by the camera can resume without limiting the operation of the pedestrian protection mechanism. As a result, in addition to a pedestrian being effectively protected from a secondary collision in the event of a collision, a secondary collision of the vehicle can also be prevented.

The present invention is not limited to the above-described example. For instance, the present invention is applicable to a type in which the pedestrian protection mechanism causes the rear of the front hood 4 to pop up to function as a cushion member. In this case, the rear end of the front hood 4 appearing in the image is set as the boundary between the non-usable area A1 and the usable area A2.

The invention claimed is:

1. An image processing device, comprising:
an onboard camera that captures an image of a driving environment in front of a vehicle;
an image recognition processor that generates a distance image within an image recognition area on a basis of the image captured by the onboard camera;
an object recognition processor that recognizes an object within the image recognition area and a distance to the object on the basis of the image captured by the onboard camera and the distance image generated by the image recognition processor; and
an image-mode switching unit that switches the image recognition area to be recognized by the object recognition processor,
wherein the image-mode switching unit checks whether a collision with a pedestrian is detected and an activation command signal is output to a pedestrian protection mechanism,
wherein, in a case where an output of the activation command signal is detected, the image-mode switching unit switches from a normal mode, in which a normal effective image area, including an area in which the pedestrian protection mechanism appears, is entirely set as the image recognition area, to an area limitation mode, in which an image area having no appearance of the pedestrian protection mechanism therein is set as the image recognition area, and
wherein the pedestrian protection mechanism includes at least one of a pedestrian protection airbag and a pop-up front hood.

2. An image processing device, comprising:
an onboard camera that captures an image of a driving environment in front of a vehicle;
an image recognition processor that generates a distance image within an image recognition area on a basis of the image captured by the onboard camera;
an object recognition processor that recognizes an object within the image recognition area and a distance to the object on the basis of the image captured by the onboard camera and the distance image generated by the image recognition processor; and
an image-mode switching unit that switches the image recognition area to be recognized by the object recognition processor,
wherein the image-mode switching unit checks whether a collision with a pedestrian is detected and an activation command signal is output to a pedestrian protection mechanism,
wherein, in a case where an output of the activation command signal is detected, the image-mode switching unit switches from a normal mode, in which a normal effective image area is entirely set as the image recognition area, to an area limitation mode, in which an image area having no appearance of the pedestrian protection mechanism therein is set as the image recognition area, and
wherein the area limitation mode includes identifying the pedestrian protection mechanism appearing in the effective image area on a basis of a color of the pedestrian protection mechanism, detecting a boundary having no appearance of the color of the pedestrian protection mechanism therein, and setting a captured vertical image area at a far side from the boundary as the image recognition area.

3. An image processing device, comprising:
an onboard camera that captures an image of a driving environment in front of a vehicle;
an image recognition processor that generates a distance image within an image recognition area on a basis of the image captured by the onboard camera;
an object recognition processor that recognizes an object within the image recognition area and a distance to the object on the basis of the image captured by the onboard camera and the distance image generated by the image recognition processor; and
an image mode switching unit that switches the image recognition area to be recognized by the object recognition processor,
wherein the image-mode switching unit checks whether a collision with a pedestrian is detected and an activation command signal is output to a pedestrian protection mechanism,
wherein, in a case where an output of the activation command signal is detected, the image-mode switching unit switches from a normal mode, in which a normal effective image area is entirely set as, the image recognition area, to an area limitation mode, in which an image area having no appearance of the pedestrian protection mechanism therein is set as the image recognition area, and wherein the area limitation mode includes determining a number of effective distance pixels in a horizontal direction of the effective image area for each of rows in a vertical direction, setting a row in which the number of effective distance pixels is larger than a preset number of non-usable-area determination pixels as a boundary, and setting a captured vertical image area at a far side from the boundary as the image recognition area.

4. An image processing device, comprising:

an onboard camera that captures an image of a driving environment in front of a vehicle;

an image recognition processor that generates a distance image within an image recognition area on a basis of the image captured by the onboard camera;

an object recognition processor that recognizes an object within the image recognition area and a distance to the object on the basis of the image captured by the onboard camera and the distance image generated by the image recognition processor; and an image-mode switching unit that switches the image recognition area to be recognized by the object recognition processor, wherein the image-mode switching unit checks whether a collision with a pedestrian is detected and an activation command signal is output to a pedestrian protection mechanism, wherein, in a case where an output of the activation command signal is detected, the image-mode switching unit switches from a normal mode, in which a normal effective image area is entirely set as the image recognition area, to an area limitation mode, in which an image area having no appearance of the pedestrian protection mechanism therein is set as the image recognition area, wherein the area in which the pedestrian protection mechanism appears in the effective image area is preliminarily set as a non-usable area, and wherein the area limitation mode includes setting a captured vertical image area at a far side from a boundary of the non-usable area as the image recognition area.

* * * * *